Patented Sept. 26, 1944

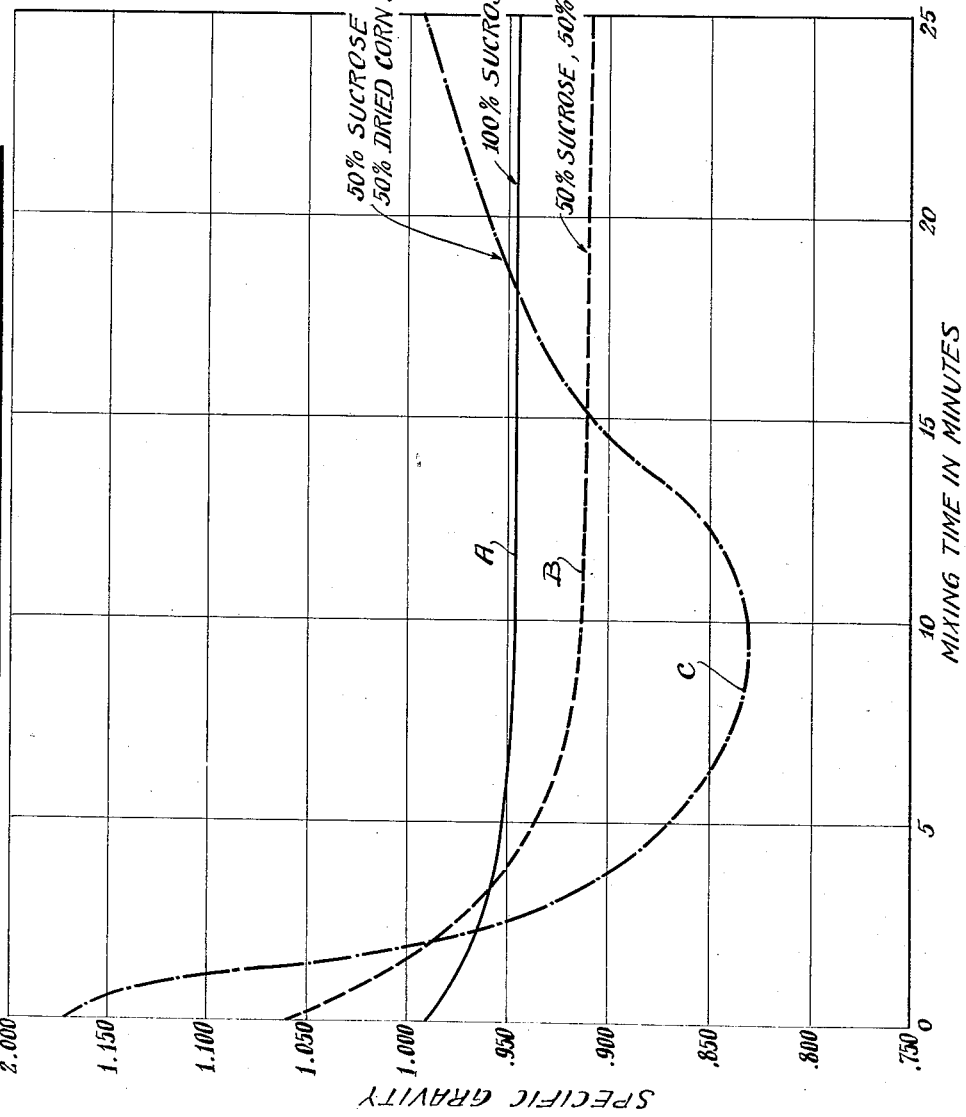

2,359,228

UNITED STATES PATENT OFFICE 2,359,228

CREAM FILLER

Robert L. Lloyd, Laurelton, and Paul H. Prentiss, Kenmore, N. Y., assignors to American Maize-Products Company, a corporation of Maine Application October 29, 1942, Serial No. 463,854

9 Claims. (Cl. 99—139)

Our invention relates to a cream filler for use on such baked goods as base cookies and wafers. This filler has a number of markedly improved properties and functions as compared with the fillers that have heretofore been employed.

This application is a continuation in part of application Serial No. 327,460 for United States patent filed by us on April 2, 1940 and entitled Cream fillers.

Heretofore fillers of the type to which this invention relates have consisted primarily of sucrose, fat and flavoring. Because of the relatively great sweetness of the sucrose, the proportion used has necessarily been limited as otherwise the cookie would be too sweet for eating in large quantities. Also, due to the physical structure of the sucrose crystal, large proportions of sucrose make the filler too dense and produce a graininess in the cream filler upon standing that renders it unsatisfactory.

In order to overcome these difficulties, attempts have been made to employ various forms of dextrose. However, these attempts have not been satisfactory. When the dextrose used is in the form of the hydrate, it gives up moisture to the cookie or cracker body to which the filler is applied, with consequent loss of crispness. Also the water of crystallization tends under certain conditions to develop rancidity in the fat present in the filler. The problem was not solved by the use of anhydrous dextrose. It is not possible or at least not practicable to grind crystalline anhydrous dextrose so as to completely reduce and eliminate granular particles that, when the sugar is used in this state, give to the sugar a gritty feel to the teeth. Smoothness and feel in the mouth are prerequisites for these products. This difficulty with anhydrous dextrose is recognized in the art. In addition we have found that anhydrous dextrose absorbs some of the moisture naturally contained in the cookie or like base so that the latter tends to become very dry and hard. Dehydrated dextrose hydrate is said to offer a solution of at least one of the problems but this product is extremely sensitive to moisture conditions and, even if it makes an excellent product when first put out, the dextrose takes up sufficient moisture from the cookie so that apparently adjacent dextrose particles coalesce or aggregate to form hard, gritty grains. The cookie is also dried by the extraction of water from it. The result is that this dehydrated dextrose hydrate is ultimately even less satisfactory than the product made using either of the more common forms of dextrose.

We have discovered that if, instead of using dextrose of any kind, one employs a non-crystalline dried corn syrup which is made up largely of dextrose, maltose and dextrines, the product in contact with a cookie or wafer is relatively stable at its pre-established moisture level, so that it neither supplies moisture to or extracts moisture from the cookie or wafer in objectionable amount. At the same time the filler made with this product is extremely smooth to the tongue and does not develop grittiness on aging.

The dried product can be made from corn syrup of varying degrees of conversion. In general, the amount of reducing sugars calculated as dextrose in these so-called syrups form about 15% to 65% but preferably we use the dried solids from a syrup having a dextrose equivalent of about 35% to 55%.

Various methods are now known for drying such corn syrups but we prefer to use the spray dried product which is produced in the form of very small generally round particles. These particles are non-crystalline, free from grittiness, and non-crystallizing in the cream filler. The moisture content of the dried material ordinarily will be from about 1% to 4%. The particle size which we have employed to advantage is that of a product which passes completely through a 40-mesh screen with an appreciable amount passing through a 200-mesh screen.

The actual cream filler is preferably made up of a combination of sucrose and the spray dried corn syrup and fat. Very satisfactory results have been obtained by replacing about 20% to 60% of the usual sucrose of a cream filler with the solidified starch conversion syrup solids. In commercial application usually between about 25% to 50% of the sucrose will be replaced. These are not limiting proportions, however, since any desired small but appreciable quantity of the syrup solids may be used with proportionate advantages in the cream filler. Likewise, the amount of syrup solids may be increased above 60%, the exact proportion to be used depending somewhat upon the use for which the cream filler is intended and the sweetness required. In certain cases where minimum sweetness is adequate, it is possible to replace virtually all of the sucrose with the syrup solids. Economically this is of considerable advantage since the cost of the solid syrup material is usually lower than the cost of sucrose.

The fat used is edible and soft or liquid (spreadable) at ordinary temperatures. The kind and the proportion in which it is used are known in the art and, as is recognized may vary over relatively wide limits to give the desired consistency to the cream filler. For the purposes of illustration the following formula and process illustrate a procedure which has been found satisfactory.

Formula

| | Pounds |
|---|---|
| Spray dried corn syrup solids | 45 |
| Sucrose | 55 |
| Coconut butter fat (melting point 84° F.) | 50 |

Salt, vanilla, and tartar in usual amounts

The cream filler according to the above formula may be made by placing the sucrose and solid corn syrup material in a mixer and then incorporating the coconut butter fat. The mixer is then started and permitted to run for about 6 to 30 minutes depending upon the speed of the mixer and the amount of aeration desired. This insures thorough and intimate admixture of the two ingredients and permits the desired emulsification of the mixture because of the properties of the solidified corn syrup as described above. The flavoring ingredients may then be added and the mixing continued for a short time to effect their incorporation. If desired, the flavoring materials which are normally used in relatively very small quantities may be mixed with a small part of the sucrose and then this mixture added to the batch.

The order of addition and mixing of the above different ingredients is not essential, although we have for practical reasons found it advantageous to place the fat on top of the sugar and solidified syrup material to avoid dusting of that material when the mixer is started. The mixing operation, that is the mechanical stirring of the ingredients raises the temperature from normal room temperature up to about 95° F. to 100° F. At this elevated temperature the fat is substantially fluid which insures good mixing of the constituents and also facilitates spreading of the cream filler. The resulting emulsion including the fat, air, and sweetening agent is substantially anhydrous but includes a small proportion of bound water present in the dried corn syrup solids. The said solids are non-crystalline.

In commercial operations for making sugar wafers in large numbers, the above described cream filler while still warm and in easily handleable form is spread on a large square of the wafer and in the case of a sandwich type wafer a similar square of wafer is placed on top of the cream filler. This sandwich is then passed through a slicing machine which cuts the mass into sugar wafers of the desired size and shape, after which they are ready for packaging and shipment.

In making sandwich cookies commercially, the cookies are preformed and baked individually in desired shape and size and the cream filler is simply deposited between two of these cookies.

The fat used in the cream filler of this invention may be any suitable type of animal or vegetable fat or oil of sufficiently low melting point to be eaten in cookies. The usual melting point range is between about 76° F. to 110° F. depending principally upon the season of the year or atmospheric temperatures. This includes both natural fats and hydrogenated fats. We have found it of advantage to use a natural vegetable fat having a substantial melting point range rather than a sharp melting point. Coconut butter works very well since it has such a melting range and does not possess the oily or greasy characteristic of some of the fats. Also, it is of suitable flavor and is highly compatible with the other ingredients.

Where no other sugar is to be used, or where it is desired to add the sugar subsequently, the cream filler composition of this invention may be made by emulsifying the fat with the solidified syrup powdery material, with or without the addition of the flavoring materials as desired. This emulsified composition might be used as such or shipped as an article of commerce for future use and with the addition of other materials thereto as desired. In such a case the fat and solidified syrup emulsion would likely be placed in a mixer and agitated sufficiently to render it somewhat fluid just prior to use so as to facilitate spreading of the material.

The cream filler of this invention not only meets the requirements in giving a product which is extremely smooth to the tongue without being unduly sweet and which neither dries out the baked goods to which it is applied nor makes them soggy, but also has other advantages that are totally unexpected.

The first unexpected quality of our filler has to do with the matter of control of specific gravity. The finished assembled cookies or wafers in which the filler is employed are ordinarily packed in boxes or containers of predetermined size that under existing law must have the minimum weight of the contents indicated on the exterior. At different times of the year there is a decided tendency for cream fillings to vary in their density. If a relatively light, fluffy filling is employed it may result in the layers of the wafer being spaced relatively far apart so that the weight of the packaged goods will not meet the weight indicated on the exterior. If the package is made large enough to contain the minimum weight at all times, it may mean a substantial overage when the filler is relatively dense.

If a filler is made up entirely from sucrose and fat and the two are beaten together while heated, it will be found that the specific gravity drops at first but soon approaches an equilibrium value. When a part of the sucrose (say, one-half) is replaced by dextrose hydrate there is a somewhat more abrupt drop in the specific gravity during the early stages of the beating but again an equilibrium is rapidly approached. With the syrup solids filler of this invention, on the other hand, it is found that a strange phenomenon occurs. When this filler is being mixed, the specific gravity drops at the outset as in the other instances but after a point of minimum specific gravity is reached the product, instead of staying at equilibrium, shows a gradual but pronounced rise of specific gravity.

This phenomenon is illustrated in the accompanying drawing showing specific gravity curves for different fillers that were mixed in comparable manner and at the same temperature and were alike except for kind of sweetening agent used. In this drawing the specific gravity is plotted against the time of agitation after a brief initial compounding period. In each case the filler was made up of 30% of fat and 70% of total sweetening agent. These curves are made up for a single set of conditions as to atmospheric temperature and humidity. This is important, as with changes in temperature and humidity, the location of the curves on the diagram (but not their general shape) may vary greatly.

The curve marked A shows the effect when all of the sweetener is pulverized sucrose. In this case the initial specific gravity is 0.99; after 10 minutes of agitation this gravity dropped to a value of just under 0.950 at which level it stayed approximately constant.

The curve marked B was derived as was the curve A except that in this case half of the sucrose had been replaced by pulverized dextrose hydrate. In this case the specific gravity initially was 1.06 and after 10 minutes it reached an approximate equilibrium at about 0.91.

In making products with the sucrose or dextrose mixture, it was found necessary to carry on the agitation for a sufficient length of time so that the mixture had reached almost its minimum specific gravity. Otherwise, the product was not sufficiently emulsified. In other words, control of the specific gravity by stopping the process short of the minimum point was not feasible.

The curve indicated by the letter C shows the peculiar effect when a starch conversion product such as dried corn syrup is substituted for half of the sucrose of the filler of curve A. In this particular case spray dried corn syrup of approximately 42 D. E. was used and the dried product contained approximately 3% of moisture. With this filler it will be noted that initially the mass had a relatively high specific gravity of approximately 1.17. When this product was agitated for about 10 minutes it underwent a very marked reduction in specific gravity dropping to about 0.830. This value however was not an equilibrium value, as in the other two cases, for it was found that on further agitation the specific gravity actually rose gradually over a period of five to eight minutes above that of either of the other two and continued to rise as stirring was continued. After 25 minutes the gravity had risen to a value of almost 1.0. The increase is considered as due to escape of air from the emulsion as the agitation proceeds, an effect not obtained with the other sweetening compositions.

Since this product like the others had a smooth consistency after time of agitation approaching 10 minutes, it is obvious that the agitation continued beyond the minimum gave control of the specific gravity over a wide range.

This very surprising effect has been found to be an important advantage in connection with the use of this product. With this cream filler the desired specific gravity can always be obtained without loss of smoothness and the wafer or cookie finally made can be given exactly the right relationship of weight to overall bulk.

While we do not wish to limit ourselves to any particular theory, it appears that the peculiar physical characteristics of the starch conversion syrup solids and particularly of the spray dried product utilized in virtually anhydrous conditions for emulsification with fat have physical effects which are entirely different from those which are obtained with the other forms of sweetening agent heretofore used and of course these effects are totally different from any results that could be obtained where water is present in substantial quantities so that the physical structure of the sweetening agent would be lost. In this connection, it may be noted that our product is strictly non-crystalline, and due to its amorphous state has both different characteristics in regard to grittiness and in regard to absorption of water and the like. It may well be that this essential difference in physical structure is one of the leading factors in giving the desired results.

Also, we find that this filler has very materially higher adhesive and cohesive qualities than the fillers heretofore produced. This is an exceedingly important factor because it has been found in experience that the cookies (and particularly the wafers (tend to separate and in such case the product is a complete loss. Physical measurements show that the filler of this invention has definitely higher adhesive and cohesive values, and actual experience has indicated that this difficulty is sufficient to reduce enormously the percentage of cripples (separated products and rejects in the bakery). Experience has shown that this reduction in loss runs as high as 90%, i. e. it is reduced to 10% of the former figure.

While we have referred particularly to the use of dried corn syrup, it is understood that other starch conversion syrups can be employed, as for example, potato or rye starch conversion syrup solids, though corn syrup solids are satisfactory and most readily available on the market.

It will be understood that it is intended to cover all changes and modifications of the example of the invention herein chosen for the purpose of illustration which do not constitute departures from the spirit and scope of the invention.

What we claim is:

1. A cream filler comprising a substantially anhydrous emulsion including finely divided sweetening material and a saft edible fat, the sweetening material including a substantial proportion of dried non-crystalline and non-crystallizing starch conversion syrup solids of reducing sugars content calculated as dextrose of about 15 to 65 percent.

2. A cream filler comprising a substantially anhydrous emulsion including finely divided sweetening material and a soft edible fat, the sweetening material including at least approximately 25 parts of dried starch conversion syrup solids, of reducing sugars content calculated as dextrose of about 15 to 65 percent, to 100 parts of total sweetening agent.

3. A cream filler as described in claim 2, the sweetening material consisting essentially of sucrose and the said syrup solids.

4. A cream filler as described in claim 1, the emulsion including air and the said syrup solids containing about 1% to 4% of water and providing substantially the only moisture in the filler.

5. A cream filler comprising an emulsion of an edible fat, sucrose, and non-crystalline particles of spray dried corn syrup solids having the structure obtained by spray-drying a corn syrup having a reducing sugar content calculated as dextrose of about 15% to 65%, such emulsion having the consistency obtained by mechanically agitating the sucrose and such spray-dried corn syrup solids with an edible fat under substantially anhydrous conditions and in contact with air, whereby air is introduced into the mass but the particles of dried corn syrup solids retain substantially their original structure, such filler being characterized by its dependable adhesion to baked goods and remaining smooth and non-gritty during storage while in contact with such baked goods.

6. A cream filler as described in claim 5, the reducing sugar content calculated as dextrose of the syrup solids being about 35% to 55%.

7. The method of making cream fillers which comprises making an emulsion of an edible fat, sucrose and non-crystalline particles of spray-dried corn syrup solids resulting from drying corn syrup having a reducing sugar content calculated as dextrose of about 15% to 65%, such emulsion being made by mechanically agitating the sucrose and dried corn syrup solids with an edible fat under substantially anhydrous conditions and in contact with air, whereby air is introduced into the mass but the particles of dried corn syrup solids retain substantially their original structure, and a filler is produced characterized by its dependable adhesion to bake goods and by the fact that it remains smooth and non-gritty during storage while in contact with such baked goods.

8. A method as specified in claim 7 in which the reducing sugar content calculated as dextrose of the syrup solids is between about 35% and 55%.

9. A method as specified in claim 7 in which the agitation is conducted for a period of more than ten minutes and until the specific gravity of the mixture has risen substantially above its minimum, but in which the agitation has been stopped before the specific gravity reaches a substantial maximum.

ROBERT L. LLOYD.
PAUL H. PRENTISS.